J. H. Brown,
*Peach Parer,*
№ 82,794.    Patented Oct. 6, 1868.
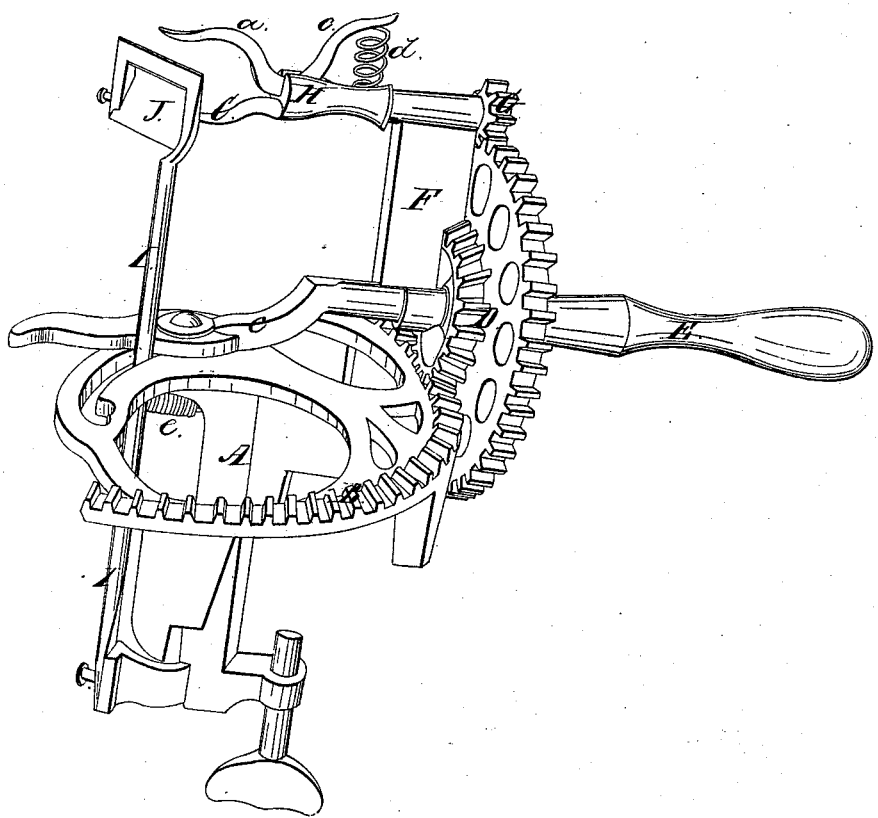
Witnesses:
Harry King
Leopold Buer
Inventor:
James H Brown
per Alexander Mason
Atty.

United States Patent Office.

JAMES H. BROWN, OF MITCHELL, INDIANA.

Letters Patent No. 82,794, dated October 6, 1868.

IMPROVED PEACH-PARER.

*The Schedule referred to in these Letters Patent and making part of the same.*

TO ALL WHOM IT MAY CONCERN:

Be it known that I, JAMES H. BROWN, of Mitchell, in the county of Lawrence, and in the State of Indiana, have invented a certain new and useful Improvement in Peach-Parer; and do hereby declare that the following is a full, clear, and exact description thereof, reference being had to the accompanying drawings, and to the letters of reference marked thereon.

The nature of my invention consists in the general arrangement of a peach-parer with a revolving fork, to hold the fruit, and an adjustable knife.

In order to enable others skilled in the art to make and use my invention, I will now proceed to describe its construction and operation.

In the annexed drawings forming part of this specification—

A represents a metal frame, which is so arranged as to be screwed to the edge of a table or bench, and provided with a half-circular rack, B, on its upper side.

In the centre of this rack an arm, C, is pivoted, which arm is provided in its end with a cog-wheel, D, and handle, E.

Said cog-wheel has two rows of cogs, as shown in the drawing, the inner or shorter fitting in the rack B, and the outer working the pinion G, which pinion is attached to the end of the fork-shaft.

This fork-shaft passes through the standard F on the arm C inwards, so that the fork, H, attached to its other end, will be over the centre of the rack.

It will be seen that by pushing or pulling the handle, the arm C will turn around the rack, and by means of the cog-wheel D and pinion G, revolve the fork, the point thereof always being at the same place.

The fork H has two prongs, one, $a$, stationary, and the other, $b$, pivoted in the fork-shaft.

The movable prong, $b$, has a handle, $c$, extending on the other side of the shaft, where it is attached to a spiral or other spring, $d$, so that the fork can adjust itself to any size of fruit.

The knife-handle I is pivoted on an arm extending from the lower part of the frame, and runs upwards through a slot in said frame, being provided at its upper end with a knife, J, so arranged that it will be at a suitable distance from the fork H.

The knife-shaft is further attached to the frame, A, by means of a spring, $e$, in such a manner that, in connection with its loose pivot end, the knife J can adjust itself to any size or shape of peach, and pare it completely.

I do not claim the arrangement of the segment B, cogs D G, horizontal shaft, having a fork and upright shaft, with a knife.

What I claim, is—

The curved prong, $a$, pivoted in its centre to the arm H, above the stationary prong, $b$, and its rear end resting on a spring, $d$, in combination with the knife-supporting shaft I, pivoted at its lower end, and working in a slot in the frame A, all as herein shown and described.

In testimony that I claim the foregoing, I have hereunto set my hand, this 2d day of June, 1868.

JAMES H. BROWN.

Witnesses:
 JOHN W. BURTON,
 MARTIN D. CRINE.